United States Patent
Hirakawa et al.

(10) Patent No.: US 6,562,151 B2
(45) Date of Patent: May 13, 2003

(54) ROLLING SHAFT MADE BY HIGH-FREQUENCY QUENCHING

(75) Inventors: Kiyoshi Hirakawa, Kanagawa (JP); Hiroshi Fukushima, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/886,021

(22) Filed: Jun. 22, 2001

(65) Prior Publication Data

US 2002/0040743 A1 Apr. 11, 2002

(30) Foreign Application Priority Data

Jun. 22, 2000 (JP) ........................ 2000-187067

(51) Int. Cl.[7] ............... C21D 9/36; C21D 1/10; C23C 8/26; F16C 33/34
(52) U.S. Cl. ....................... 148/318; 148/232
(58) Field of Search ................. 148/318, 232

(56) References Cited

U.S. PATENT DOCUMENTS 5,137,375 A * 8/1992 Murakami et al. .......... 384/450
6,162,390 A * 12/2000 Bellus et al. ............... 420/100
6,325,867 B1 * 12/2001 Okita et al. ................ 148/318

FOREIGN PATENT DOCUMENTS

| JP | JP 06-128720 A | * | 5/1994 | ............ C23C/8/38 |
| JP | JP 07-090363 A | * | 4/1995 | ............ C21D/6/00 |

* cited by examiner

Primary Examiner—Roy King
Assistant Examiner—Harry D. Wilkins, III
(74) Attorney, Agent, or Firm—Sughrue Mion, PLLC

(57) ABSTRACT

In a rolling shaft relatively rolling with respect to rolling members provided in a radial needle roller bearing, the rolling shaft is composed of a steel containing 0.5 to 1.2 wt % carbon and is provided with a surface layer 3a containing 0.05 to 0.4 wt % nitrogen, having Vickers hardness being Hv650 or more through a high frequency quenching performed thereto and a residual austenite being 15 to 40 vol %, and a core portion of the rolling shaft contains 0 vol % of the residual austenite.

15 Claims, 2 Drawing Sheets

ROLLING SHAFT MADE BY HIGH-FREQUENCY QUENCHING

BACKGROUND OF THE INVENTION

The present invention relates to a rolling shaft, and in particular relates to the rolling shaft corresponding to an inner ring of a rolling bearing (in particular, a radial needle bearing).

Conventionally, as the rolling shaft corresponding to the inner ring of the radial needle bearing, such a material has been used that a through-hardening steel as SUJ2 which is further performed with a quenching and a tempering so as to provide a Vickers hardness being Hv650 or more. In this case, for providing the Vickers hardness of Hv650 or more, in response to processing requirements as a lathe turning, the rolling shaft having Vickers hardness Hv300 or less is performed to an outer periphery thereof with the lathe turning, and subsequently the outer periphery is performed with a high frequency quenching.

However, recently the radial needle bearing has been very often used under high load. In this case, a rolling fatigue resistance of the rolling shaft corresponding to the inner ring of the radial needle bearing is not sufficient with the conventional through-hardening steel such as SUJ2 or the ordinary high frequency-quenched steel. Major part of such insufficient rolling fatigue resistance is concerned with tolerance (surface fatigue resistance) against a surface fatigue which is caused in a surface of a raceway of the rolling shaft by contamination of a lubricant or supply shortage thereof.

In the radial needle bearing, such surface fatigue is caused in a portion from the surface thereof till a depth corresponding to 2% of the diameter Da of the rolling element (called said depth as "2% Da" hereafter), or in a portion from the surface till 0.1 mm in the depth of an absolute value, and in particularly a large surface fatigue occurs in a portion until 0.05 mm from the surface. In order to improve the surface fatigue resistance, it is necessary that a residual austenite is 15 to 40 vol % (preferably, 20 to 35 vol %) in the surface layer which is effected with fatigue. However, there is a problem that, for rendering the residual austenite to be 15 to 40 vol % (preferably 20 to 35 vol %) by the through-hardening or the ordinary high frequency-quenching, the quenching temperature must be heightened, whereby austenite crystal particles in a hardened part by quenching are coarsened, so that the surface fatigue resistance goes down.

It has been found out that, even if the residual austenite is present and a stress caused in the rolling shaft is within a limit of elasticity, the rolling shaft comprising the bearing steel (through-hardening) of SUJ2 which is worked under high load, is affected with a plastic deformation by a time-passing decomposition (transformation into martensite) of the residual austenite by the stress.

Further, the conventional rolling shaft is involved with another problem that it is made of a material (SC, SCr, SCM, SNCM) having Vickers hardness of Hv300 or less and carbon concentration of 0.4 wt % or less, which is carried out on the outer periphery with the high frequency-quenching (hardness of surface layer is Hv650 or more), and since part (core portion) other than the surface layer has hardness Hv300 or less and if a high impact load is given, the plastic deformation probably occurs.

SUMMARY OF THE INVENTION

It is, accordingly, an object of the invention to solve the problems of the conventional rolling shaft and provide a rolling shaft which is excellent in the rolling fatigue resistance and is least to generate the plastic deformation.

For solving the problems, the rolling shaft of the invention relatively rolling with respect to an opposite member, is characterized in that the rolling shaft comprises a steel containing 0.5 to 1.2 wt % carbon and is provided with a surface layer containing 0.05 to 0.4 wt % nitrogen, having Vickers hardness being Hv650 or more through a high frequency quenching performed thereto and a residual austenite being 15 to 40 vol %, and a core portion of the rolling shaft contains 0 vol % of the residual austenite.

If the rolling shaft is produced in the way that, after nitrogen is 0.05 to 0.4 wt % nitrified into the surface, the high frequency-quenching is performed to provide a surface layer having Vickers hardness of Hv650 or more and the residual austenite of 15 to 40 vol %, the residual austenite may be formed without coarsening the austenite crystal particles in the surface layer. Thus the rolling fatigue resistance may be increased in the raceway surface (the above mentioned surface layer).

Further, in case the rolling shaft is produced in the way that, after nitrogen is 0.05 to 0.4 wt % nitrified into the surface, the quenching and the tempering are performed to thermally refine the whole hardness of the rolling shaft to be Hv300 to 500 (preferably Hv400 to 500), and subsequently the high frequency-quenching is practiced to provide the surface layer having Vickers hardness of Hv650 or more and the residual austenite of 15 to 40 vol %, the rolling fatigue resistance in the raceway surface (the above mentioned surface layer) may be increased as in the above mentioned way, and at the same time, the hardness of the other part (core portion) than the surface layer may be made Hv300 to 500 (preferably Hv400 to 500) and the residual austenite in the other part (core portion) than the surface layer may be made 0 vol %, whereby the plastic deformation in the rolling shaft may be prevented, which is caused together with the time-passing decomposition of the residual austenite owing to the stress (stress within the elasticity limit) occurring in the rolling shaft, and further, the plastic deformation when adding the high impact load may be prevented.

The surface layer referred to in the invention is meant by the portion from the surface to 2% Da, or the portion from the surface until 0.1 mm (in particular 0.05 mm) in the depth of the absolute value.

Herein, critical meanings of these values will be described.

[Carbon Concentration in the Steel: 0.5 to 1.2 wt %]

If the carbon concentration is less than 0.5 wt %, it is difficult to obtain a stabilized hardness Hv650 (Hrc58) or more in the surface layer and in the high frequency-quenched portion. For obtaining the preferred hardness Hv650 (Hrc58) or more, regardless of the dimensions of the rolling shaft, the lower limit should be 0.5 wt %.

Further, when performing a carbonization by way of a carbonitriding process, 0.5 wt % or more of carbon is needed for forming fine (0.5 to 1.0 $\mu$m) carbonitrides in the surface layer.

Further, if the carbon concentration is more than 1.2 wt %, macro carbides are easily produced in the steel to decrease a rolling life.

[Nitrogen Concentration in the Surface Layer: 0.05 to 0.4 wt %]

If nitrogen is made solid together with carbon in a quenched structure, it has an effect strengthening a matrix. From this fact, as the surface hardness is increased and the tempering resistibility is also increased, an abrasion resistance is available over a wide temperature range, so that the rolling shaft may have a long service life.

If the nitrogen concentration is less than 0.05 wt %, the abrasion resistance is insufficient and it is difficult to obtain 15 vol % or more of the residual austenite in the surface layer. Exceeding 0.4 wt %, it takes a long time for processing (polishing or grinding) after the heat treatment. A post processing cost is heightened, accordingly.

In order to make the abrasion resistance and the post processing cost optimum, preferable is 0.1 to 0.3 wt %.

Particularly, it is preferable that the surface layer for supporting the rolling faces and making difficult to generate the surface fatigue is made of the portion of 0.05 mm or more, or 2% Da from the surface of the completed rolling shaft, and the nitrogen concentration at the positions (the portion of more than 0.05 mm, or 2% Da from the surface) is 0.1 wt % or more, preferably 0.2 wt % or more.

[Hardness in the Surface Layer: Vickers Hardness Hv650 (Hrc58) or more]

If the hardness in the surface layer is less than Hv650, it is insufficient, so that the surface fatigue (rolling fatigue) is early produced, and the life of the rolling shaft is reduced.

[Hardness in the Core Part: Vickers Hardness Hv of 300 to 500]

If the Vickers hardness is less than Hv 300, the rolling shaft is easily generated with a yield, and the plastic deformation is apt to appear owing to the high impact load, so that warp of the rolling shaft is large. When the load acts thereon from the opposite members (needles in a case of the radial needle bearing) such as the rolling elements of the rolling bearing, the surface fatigue is locally produced, and consequently, the life of the rolling shaft is reduced.

Being more than Hv500, although the yield is less to occur but a toughness is reduced (rupture elongation is lowered), the rolling shaft might be broken, and therefore the Vickers hardness is preferably Hv400 to 500 from the viewpoint of the plastic deformation and the impact resistibility.

[Amount of the Residual Austenite in the Surface Layer: 15 to 40 vol %]

For example, if the needle bearing is used in transmission and engine driving system of automobiles, the surface fatigue easily occur due to foreign materials such as worn particles coming into the lubricant or shortage of lubricant supply. In the invention, other than hardening of the surface and providing of carbonitrides in the surface, it has been found that the surface fatigue may be reduced by a certain kind of a damper effect of the residual austenite.

If the residual austenite is less than 15 vol %, the damper effect is little for mitigating the surface fatigue. The life of the rolling shaft is, therefore, shortened. Being more than 40 vol %, the surface hardness is decreased so that the abrasion resistibility and the surface fatigue resistibility are rather detracted.

If the residual austenite is 20 to 35 vol %, a more excellent and stabilized life may be obtained.

[Amount of the Residual Austenite in the Core Portion: 0 vol %]

With presence of the residual austenite, the plastic deformation is caused by transformation into martensite. Although the amount of the residual austenite slightly influences the surface layer, however, since the core portion occupies a major part in volume of the rolling shaft, and if the residual austenite exists in the core portion, the rolling shaft is easily effected with the plastic deformation and the rolling shaft largely bends, and consequently, the fatigue strength goes down (owing to the local surface fatigue caused by the bending stress) Namely, if the residual austenite in the core portion is 0 vol %, the plastic deformation rarely occurs in the rolling shaft, though the residual austenite exists in the surface layer.

"0 vol %" may be made by thermally refining, otherwise a material including the "0 vol %" residual austenite may be used as it is. Thereby, the rolling shaft is not deformed by an external stress or a heat.

Thus according to the invention, by making the residual austenite in the core portion 0 vol % and making the hardness in the core portion Hv300 to 500, the rolling shaft is prevented from the plastic deformation due to an external force acting thereon. Further, by giving the hardness, the nitrogen amount and the residual austenite to the rolling element as well as the rolling surface, the rolling life is elongated.

DETAILED DESCRIPTION OF THE PREFERRED EMBODIMENTS

A mode for carrying out the rolling shaft of the invention will be explained in detail with reference to FIG. 1.

Figure 1:
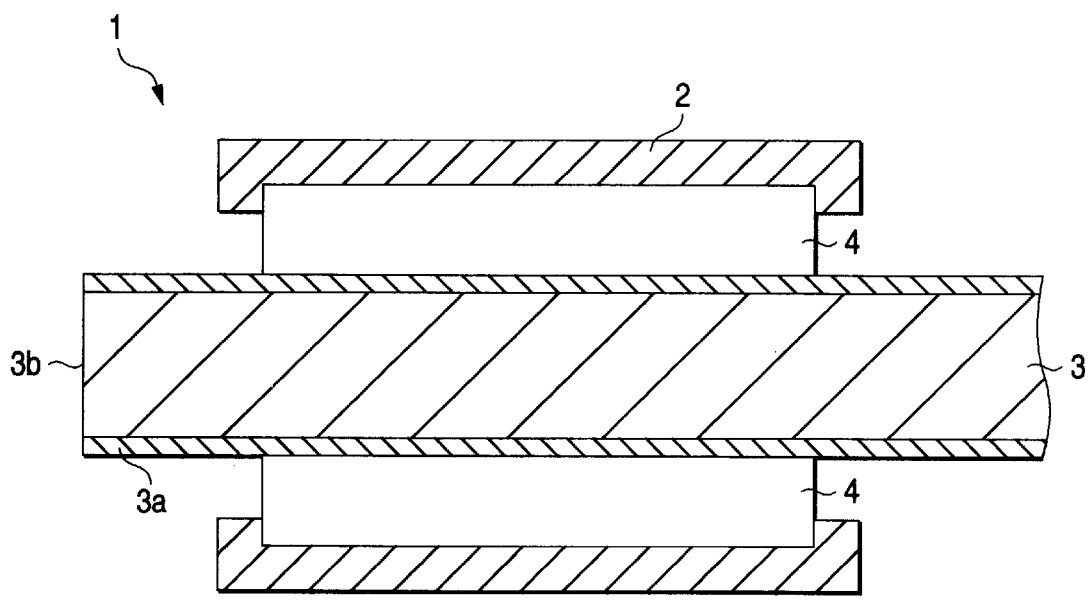
FIG. 1 shows a cross sectional view of the radial needle roller bearing provided with the rolling shaft of one embodiment of the invention.

As shown in FIG. 1, a radial needle roller bearing 1 for a planetary gear comprises an outer ring 2, a rolling shaft 3 corresponding to an inner ring, a plurality of rolling elements 4 rotatably disposed between the outer ring 2 and the rolling shaft 3, and a holder (not shown) for holding the rolling elements between the outer ring 2 and the rolling shaft 3. The rolling shaft 3 relatively rolls with respect to the rolling elements 4 as the opposite members. By the way, the holder may be not furnished.

The outer ring 2 and the rolling elements 4 are made of a bearing steel of SUJ2 for carrying out a through-hardening, which is further performed with the quenching and the tempering, or is performed with the carbonitriding, followed by the quenching and the tempering. The holder is made of a plate such as SPCC which is processed by a press without performing the heat treatment, or which is performed with the carbonization or carbonitriding followed by the quenching and the tempering.

The rolling shaft 3 is fabricated with a steel containing 0.5 to 1.2 wt % carbon and has a surface layer 3a provided on the outer periphery composing a raceway surface as will be referred to later. The surface layer 3a is formed by nitrifying 0.05 to 0.4 wt % nitrogen into the portion of 0.05 mm or more to 2% Da or less in depth of the absolute value from the outer periphery surface of the rolling shaft 3, carrying out the high frequency-quenching to harden Hv650 or more the requisite depth including the above mentioned portion in consideration of the lord of the rolling elements (the depth is 0.5 mm or more to 0.5 Da or less in depth of the absolute value from the surface), and rendering the residual austenite to be 15 to 40 vol %. With the surface layer 3a, the rolling shaft 3 may have the raceway surface with the excellent rolling fatigue resistibility.

Incidentally, the rolling shaft 3 may depend on that, after nitrogen is 0.05 to 0.4 wt % nitrified into the portion of from 0.05 mm or more in depth of the absolute value to 2% Da or less from the outer periphery surface, the quenching and the tempering are performed to thermally refine the entire residual austenite to be 0 vol % and the hardness to be Hv300 to 500 (preferably Hv400 to 500), and subsequently the high frequency-quenching is practiced to harden Hv650 or more until a requisite depth including the above mentioned portion (surface layer 3*a*) and the residual austenite is rendered to be 15 to 40 vol %.

Because the whole hardness in the rolling shaft 3 is high and the residual austenite is 0 vol % in the surface layer 3*a* and the other portion (core portion) than the hardened portion by the high frequency-quenching, the rolling shaft 3 may be prevented from the plastic deformation in case a high impact load is given, or from the plastic deformation caused by a time-passing decomposition of the residual austenite due to stress in the elasticity limit produced in the rolling shaft 3.

Any rolling shaft 3 is required to have the nitrified depth of 0.05 mm or more and 2% Da or less for increasing the surface fatigue resistibility of the raceway surface. Further, since the nitrogen concentration of the surface layer 3*a* is 0.05 to 0.4 wt %, the residual austenite in the surface layer 3*a* may be rendered to be 15 to 40 vol % after the high frequency-quenching.

As methods for intruding the nitrogen into the surface, other than the carbonitriding, there may be taken up salt-bath nitriding, gas-nitriding, or ion-nitriding. There are cases that the high frequency-quenching is performed in the longitudinal direction all over the outer periphery surface of the rolling shaft 3, or performed exclusively to the portion (raceway surface) in contact with the rolling elements 4 because of calk-processing the edge ends of the shaft. When an end surface 3*b* of the rolling shaft 3 is brought in contact with another member, the end surface 3*b* is often performed with the high frequency-quenching to prevent abrasion.

By the way, the embodiment is shown as one example of the invention, and the invention should not be limited to the embodiment.

For example, in the embodiment, explanation has been made in reference to the radial needle roller bearing for the planetary gear. However, the rolling shaft of the invention may be applied to other various types of rolling bearings, and further not only to the rolling bearings but also to other rolling apparatus.

Next reference will be made to results of serving life tests with respect to substantially similar rolling shafts to the rolling shaft 3 above embodied.

Steels fabricating the rolling shafts are SUJ2, S55C (JIS), SAE5160 and SCr420 (JIS) of the compositions as shown in Table 1. In Table 1 and Table 2 which will be described later, SUJ2, S55C, SAE5160 and SCr420(JIS) are indicated as A, B, C and D respectively. The same signs will be used in the following description.

TABLE 1

|   | C | Si | Mn | Cr |
|---|---|----|----|----|
| A | 1.00 | 0.26 | 0.39 | 1.46 |
| B | 0.52 | 0.17 | 0.81 | 0.82 |
| C | 0.45 | 0.23 | 0.80 | 1.02 |
| D | 0.21 | 0.28 | 0.67 | 1.10 |

Unit of concentration of each element: wt %

The above mentioned steels are performed with surface treatments as shown in Table 2 to complete the rolling shafts having the surface layers and the core portions of physical properties as shown in Table 2. The nitrogen concentration and the residual austenite were respectively measured by use of an emission spectra analysis apparatus and an X-ray diffraction apparatus.

TABLE 2

|  |  | Surface layer | | | | Core | | | | | |
|---|---|---|---|---|---|---|---|---|---|---|---|
|  |  | Density | | | | | | | | | |
|  | Steels[1] | (wt %) of N Layer | γR[2] vol % | Hardness Hv | G | Hardness Hv | γR[2] vol % | H[3] | Life (L$_{10}$) | I | J |
| Ex.1 | A | 0.05 | 15 | 750 | 740 | 450 | 0 | V | 2.0 | 2 | 5500 |
| Ex.2 | A | 0.4 | 40 | 746 | 740 | 400 | 0 | V | 3.8 | 3 | 4800 |
| Ex.3 | B | 0.05 | 17 | 700 | 690 | 300 | 0 | V | 2.2 | 2 | 4200 |
| Ex.4 | B | 0.4 | 42 | 720 | 690 | 450 | 0 | V | 4.0 | 3 | 5500 |
| Ex.5 | A | 0.4 | 40 | 750 | 740 | 190 | 0 | U | 3.6 | 3 | 2500 |
| Com.1 | A | 0 | 12 | 745 | — | 745 | 12 | W | 1.2 | 30 | 6700 |
| Com.2 | B | 0 | 10 | 680 | — | 680 | 7 | W | 1.0 | 18 | 6600 |
| Com.3 | A | 0.5 | 45 | 750 | — | 750 | 15 | X | 1.5 | 35 | 6800 |
| Com.4 | B | 0.55 | 47 | 700 | — | 680 | 7 | X | 1.7 | 20 | 6500 |
| Com.5 | C | 0 | 8 | 630 | — | 230 | 0 | Y | 0.9 | 3 | 2800 |
| Com.6 | D | 0 | 40 | 746 | — | 270 | 0 | Z | 0.8 | 3 | 3500 |

Ex.: Example Com.: Comparative Example
G: Hardness Hv of high freguency quenching part except surface layer
H: Surface treating methods
I: Bending amount (μm) of creep bending test
J: 0.5 mm plastic deforming load N
[1]Refer to Table 1
[2]Residual Austenite
[3]U: Carbonitriding-High frequency quenching-Tempering
V: Carbonitriding-Thermal refining-High frequency quenching-Tempering
W: Quenching & Tempering
X: Carbonitriding-Quenching & Tempering

TABLE 2-continued

| | Surface layer | | | | Core | | | | | |
|---|---|---|---|---|---|---|---|---|---|---|
| | Density | | | | | | | | | |
| Steels[1] | (wt %) of N Layer | γR[2] vol % | Hardness Hv | G | Hardness Hv | γR[2] vol % | H[3] | Life (L$_{10}$) | I | J |

Y: High frequency quenching-Tempering
Z: Carburizing-Thermal refining-High frequency quenching-Tempering The conditions of the surface treatments in Table 2 are as follows.
Carbonitriding: performed for 2 to 5 hours under the atmosphere of RX-gas+enriched gas+ammonia-gas.
Carbonization: performed for 2 to 4 hours under the atmosphere of RX-gas+enriched gas.
Quenching: performed for 0.5 to 1 hour at 830 to 870° C.
Tempering: performed for 1.5 to 2 hours at 160 to 450° C.
High frequency-quenching: performed under the conditions of
  frequency 30 KHz, voltage 10 KV, current 10A, feeding speed of the rolling shaft 2 to 8 m/sec, cooling water 35 L/min.

The nitrogen concentration in the surface layer was adjusted by changing the concentration of ammonia-gas in the atmosphere in the range of 1 to 7 vol % during carbonitriding. Further, the hardness of the surface layer was adjusted by changing the feeding speed of the rolling shaft in the high frequency-quenching or by changing the quenching temperature. The hardness in the core portion was adjusted by the tempering temperature.

The service life tests were performed with the rolling shafts of diameter 10 mm being mounted to a shell type needle bearing (inner diameter 10 mm, outer diameter 14 mm, width 10 mm) and by use of a box type testing machine of Nippon Seiko Kabushiki Kaisha. In this connection, the tests were made under the conditions that the rotation number of the rolling shaft was 5000 rpm, the radial load to the rolling shaft was 1500 N, and the lubricant was prepared by mixing #68 turbine oil with Fe$_3$C powder (hardness Hv870, average diameter 74 to 147 μm) of 300 ppm. Evaluation was shown by relative values with L$_{10}$ being the life in case the vibration of the bearing was three (3) times of the initial vibration, and with L$_{10}$ of the rolling shaft of a through-hardening steel B being 1.

The bending test of the rolling shaft was performed for investigating influences of the residual austenite and the hardness in the core portion to bending of the rolling shaft. The rolling shafts of diameter 10 mm and length 120 mm were fixedly supported at spaces of 100 mm, and the bending load was given to the center portion thereof. In the creep bending test, the bending amount was measured after the rolling shaft was held for 25 hours with the load 1000 N being given thereto at 160° C. In the 0.5 mm. plastic deformation test, the load given to the rolling shaft at room temperatures was gradually increased, and a load was measured where the plastic deformation of 0.5 mm occurred. The test results are shown in Table 2.

As shown in Table 2, all of the examples 1 to 4 show 0 vol % of the residual austenite in the core portions, the nitrogen concentration, the surface layer hardness and the core portion hardness satisfy the range of the invention, and the bendings were small. The example 5 shows the core portion hardness which failed to satisfy the range of the invention, but since the residual austenite satisfies, the bend is small.

From the results, it is seen that the bending amount by the creep bending test is extremely reduced if the residual austenite in the core portion is made 0 vol %. Further, it is seen that if the core portion hardness is more than Hv300, the load necessary to the plastic deformation of the rolling shaft increases.

The comparative examples 1 and 2 are conventional through-hardening rolling shafts performed with no nitrifying thereto, having the residual austenite in the surface layer out of the range of the invention, and being poor in the surface fatigue resistance. Particularly, the residual austenite in the core portion is so high as 7 to 12 vol % that may easily produce the plastic deformation, and therefore, the bending is large and the life is short.

The comparative examples 3 and 4 are performed with the nitriding, and the surface layer hardness and the core portion hardness are in the range of the invention, but the residual austenite in the surface layer is out of the range of the invention. The damper effects are, therefore, insufficient and the life is short. Particularly, as the residual austenite in the core portion is high, the bending amount of the rolling shaft is large as in the examples 1 and 2.

From the test results, it is seen that the surface layer of the rolling shaft is preferably 0.15 to 0.4 wt % of nitrogen concentration, 15 to 40 vol % of the residual austenite, Hv650 or more of hardness (preferably the upper limit is about Hv770 from the viewpoint of toughness). In particular, it is seen that as to the bending of the rolling shaft, the core portion hardness is preferably Hv300 to 500 and the residual austenite in the core portion is preferably 0 vol %. Especially, important are the nitrogen concentration in the surface layer and the residual austenite in the surface layer and in the core portion.

Next, for investigating the two parameters (the nitrogen concentration in the surface layer and the residual austenite) more in detail, the life tests were performed under severer conditions than the above performed life tests.

The rolling shafts used in the instant test were produced in the same way as the examples 3 and 4 and had fixed the surface layer hardness to be Hv720, the core portion hardness to be Hv400, and the residual austenite in the core portion to be 0 vol %, and as to the nitrogen concentration and the residual austenite in the surface layer, the tests were carried out at different values.

The method for performing the life test is same as the preceded life tests excepting that the rotation number of the rolling shaft is 7000 rpm and the radial load to the rolling shaft is 1568N.

Figure 2:
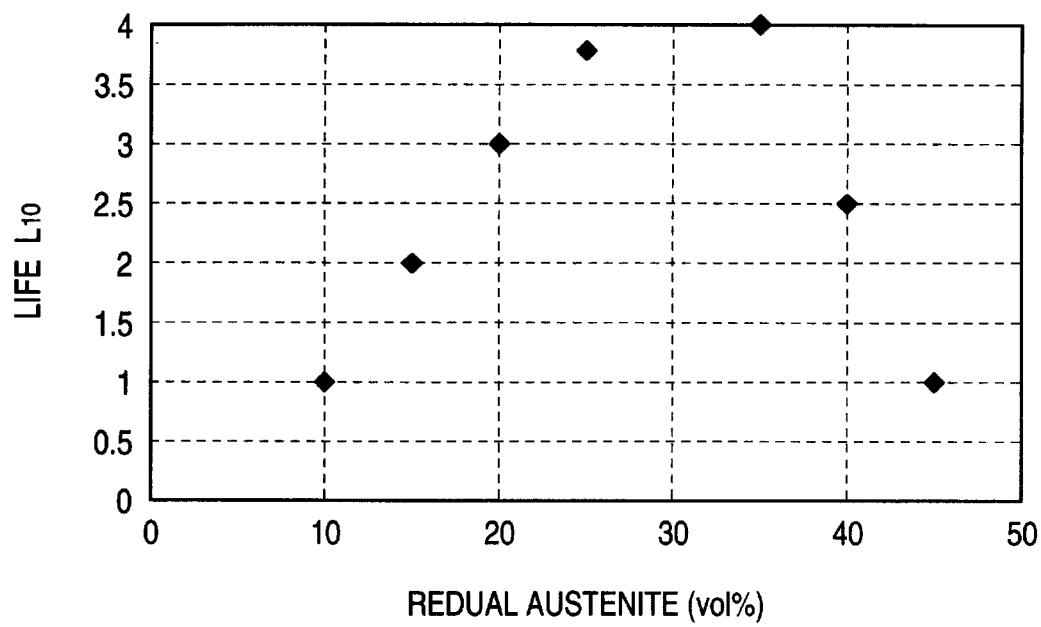
FIG. 2 is a graph showing a relationship between the residual austenite in the surface layer and the serving lives.

At first, FIG. 2 shows the results in the case that the surface layer hardness, the core portion hardness and the residual austenite in the core portion were fixed as above mentioned values, while the nitrogen concentration in the surface layer was fixed to be 0.1 wt % and the residual austenite in the surface layer was variously changed. A vertical axis in FIG. 2 showing relative values when the life L$_{10}$ of the comparative example 2 is 1.0.

The rolling shafts containing the residual austenite in the surface layer being 15 to 40 vol % showed excellent lives, and particularly those of 20 to 35 vol % showed very excellent lives.

Figure 3:
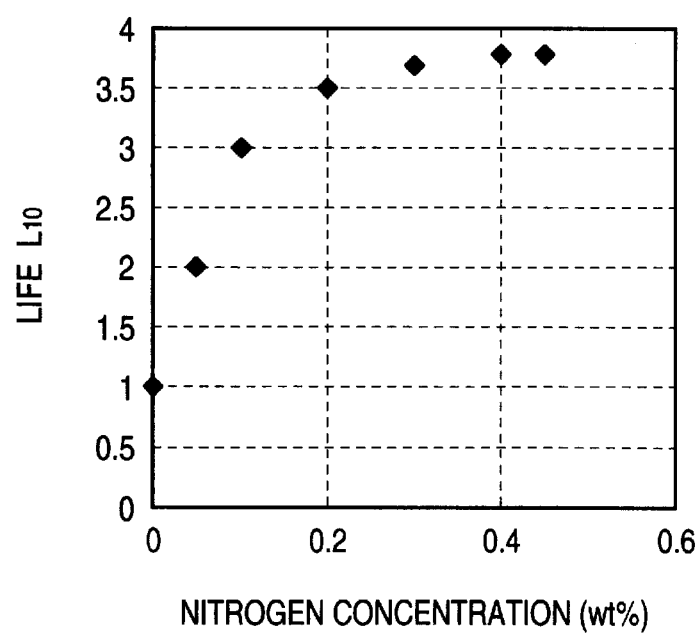
FIG. 3 is a graph showing a relationship between the nitrogen concentration in the surface layer and the serving lives.

Subsequently, FIG. 3 shows the results in the case that the surface layer hardness, the core portion hardness and the residual austenite in the core portion were fixed as above mentioned values, while the residual austenite in the surface layer was fixed to be 25 vol % and the nitrogen concentration in the surface layer was variously changed. A vertical axis in FIG. 2 showing relative values when the life $L_{10}$ of the comparative example 2 is 1.0.

The examples having the nitrogen concentration of 0.05 to 0.4 wt % showed excellent lives as 1.5 or more. It is seen that the life is generally stabilized with 0.1 wt % or more of the nitrogen concentration and is almost saturated with 0.2 wt % or more of the nitrogen concentration. With more than 0.4 wt %, it takes a long time for processing (polishing or grinding) after the heat treatment and also for nitrifying. Therefore, the nitrogen concentration is preferably 0.1 to 0.3 wt % in consideration of balance between the life and the workability.

From the above mentioned, it is seen that the life of the rolling shaft may be particularly elongated if the nitrogen concentration and the residual austenite in the surface layer are combined with optimum values.

Namely, the rolling shaft of the invention is not furnished with an inner ring as the rolling shaft of the needle bearing, and the present rolling shaft is very effective when the rolling shaft is served as the rolling member and is used as a rolling member under the conditions of the severe lubricating, the high load and impact force.

As steels for fabricating the rolling shafts, employed are SCr, SC, SK, SKS, SCM, SNCM, or high carbon Cr bearing steels as carbon steels (enough with alloy steels) containing 0.5 to 1.2 wt % carbon, the nitrogen is 0.05 to 0.4 wt % nitrified into the portion of 0.05 mm or more and 2% Da or less from the surface thereof, followed by performing the high frequency-quenching, thereby to increase the surface fatigue resistance (abrasion resistance), and the residual austenite in the core portion is reduced to 0 vol %, otherwise the residual austenite in the core portion is reduced to 0 vol % and further the hardness in the core portion is made Hv300 to 500, thereby to prevent the rolling shaft from the plastic deformation under the influence of the external force and the heat.

Since nitrogen is a solution strengthening element in place of carbon, nitrogen may prevent the austenite crystal particles from being coarsened, which spoils the surface fatigue resistance. Further, the residual austenite in the surface layer to be 15 to 40 vol % is effective in increasing the surface fatigue resistance.

In addition, a presence of the core portion having the toughness under the surface layer gives an impact resistance to the rolling shaft.

In addition to the nitrogen concentration and the residual austenite in the surface layer, an optimum combination of the surface layer hardness, the core portion hardness and the residual austenite in the core portion may produce such a rolling shaft being excellent in the surface fatigue resistance and least to create the plastic deformation.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As mentioned above, the rolling shaft of the invention is excellent in the rolling fatigue resistance and difficult to generate the plastic deformation.

What is claimed is:

1. A rolling shaft relatively rolling with respect to opposite member and made of a steel containing 0.5 to 1.2 wt % carbon, said rolling shaft comprising:
   a surface layer containing 0.05 to 0.4 wt % nitrogen, having Vickers hardness being Hv650 or more through a high frequency quenching performed thereto and a residual austenite being 15 to 40 vol %; and
   a core portion of the rolling shaft contains 0 vol % of a residual austenite.

2. The rolling shaft according to claim 1, wherein the surface layer contains 0.1 to 0.3 wt % nitrogen.

3. The rolling shaft according to claim 1, wherein the surface layer has the residual austenite in the range of 20 to 35 vol %.

4. The rolling shaft according to claim 1, wherein the core hardness of said rolling shaft is in the range of Hv300 to Hv500.

5. The rolling shaft according to claim 1, wherein the core hardness of said rolling shaft is in the range of Hv400 to Hv500.

6. The rolling shaft according to claim 1, wherein the surface layer is a portion defined from the surface to a depth in the range of 0.05 mm to 2% Da, where 2% Da denotes 2% of the diameter Da of a rolling element which is rotatably disposed between said rolling shaft and said opposite member.

7. The rolling shaft according to claim 1, wherein said rolling shaft is an inner ring of a bearing.

8. The rolling shaft according to claim 1, wherein said rolling shaft is an inner ring of a radial needle bearing.

9. The rolling shaft according to claim 1, wherein said rolling shaft exhibits a bending amount of 3 μm or less in a creep bending test.

10. A method of making a rolling shaft comprising:
    providing a rolling shaft made of a steel containing 0.5 to 1.2 wt % carbon;
    nitrifying 0.05 to 0.4 wt % of nitrogen into said rolling shaft so as to form a surface layer;
    quenching and tempering said rolling shaft so as to thermally refine the entire residual austenite to be 0 vol %;
    quenching said rolling shaft using a high-frequency quenching process so as to provide the surface layer with a Vickers hardness of Hv650 or more and a residual austenite of 15 to 40 vol %, wherein said high-frequency quenching is performed so that a core portion of said rolling shaft maintains a residual austenite content of 0 vol %.

11. The method of claim 10, wherein said nitrifying is performed so as to nitrify 0.1 to 0.3 wt % of nitrogen into said rolling shaft.

12. The method of claim 10, wherein said high-frequency quenching process is performed so as to provide the surface layer with a residual austenite content of 20 to 35 vol %.

13. The method of claim 10, wherein said quenching and tempering is performed so as to provide said core portion with a Vickers hardness of Hv300 to 500.

14. The method of claim 10, wherein said quenching and tempering is performed so as to provide said core portion with a Vickers hardness of Hv400 to 500.

15. The method of claim 10, wherein said nitrifying is performed so as to form said surface layer with a depth, from the surface of said rolling shaft, of 0.05 mm to 2% Da, where 2% Da denotes 2% of the diameter Da of a rolling element which contacts said rolling shaft.

* * * * *